US009330391B1

(12) United States Patent
Bai et al.

(10) Patent No.: US 9,330,391 B1
(45) Date of Patent: May 3, 2016

(54) TEMPORARY MEMBERSHIP IN ONLINE COMMUNITIES

(71) Applicant: INTERNATIONAL BUSINESS MACHINES CORPORATION, Armonk, NY (US)

(72) Inventors: Kun Bai, Elmsford, NY (US); Di Ling Chen, Bei Jing (CN); Christian B. Kau, Los Altos, CA (US); Zhi Cheng Liu, Beijing (CN); Patrick J. O'Sullivan, Dublin (IE)

(73) Assignee: INTERNATIONAL BUSINESS MACHINES CORPORATION, New York, NY (US)

( * ) Notice: Subject to any disclaimer, the term of this patent is extended or adjusted under 35 U.S.C. 154(b) by 0 days.

(21) Appl. No.: 14/591,595

(22) Filed: Jan. 7, 2015

(51) Int. Cl.
*G06Q 30/00* (2012.01)
*G06Q 50/00* (2012.01)
*G06K 5/00* (2006.01)

(52) U.S. Cl.
CPC ................ *G06Q 30/01* (2013.01); *G06Q 50/01* (2013.01)

(58) Field of Classification Search
CPC ............ G06Q 50/12; G06Q 20/06312; G06Q 30/0284; A47G 23/10; A47G 23/12
USPC ..................................................... 235/462.44
See application file for complete search history.

(56) References Cited

U.S. PATENT DOCUMENTS 7,184,524 B2 2/2007 Digate et al.
7,797,345 B1 * 9/2010 Martino ............ G06F 17/30867 707/792
8,707,405 B2 4/2014 O'Donnell et al.
2002/0129095 A1 9/2002 Hatalkar
2004/0193691 A1 * 9/2004 Chang .................. G06Q 10/107 709/206
2005/0192156 A1 * 9/2005 Daikeler et al. .................. 482/9
2007/0157292 A1 7/2007 Danner et al.
2010/0042511 A1 * 2/2010 Sundaresan ............ G06Q 10/10 705/26.1
2011/0246907 A1 * 10/2011 Wang ................. G06Q 30/0224 715/751
2011/0314017 A1 * 12/2011 Yariv ..................... G06Q 30/02 707/737
2011/0314115 A1 * 12/2011 Nagaraj ........................ 709/206
2012/0005215 A1 * 1/2012 Chow ............................ 707/748
2012/0036444 A1 * 2/2012 Andersen ...................... 715/738
2012/0158637 A1 * 6/2012 Kshetramade et al. ......... 706/50
2013/0091208 A1 4/2013 Rajakarunanayake et al.
2013/0205215 A1 * 8/2013 Dunn ..................... G06Q 50/01 715/738
2013/0304772 A1 11/2013 Fay et al.
2014/0059651 A1 2/2014 Luster et al.
2014/0068689 A1 * 3/2014 Sirpal et al. ................... 725/109
2014/0189802 A1 * 7/2014 Montgomery .................... 726/4
2014/0222702 A1 * 8/2014 Jennings ................ G06Q 50/01 705/319
2015/0006242 A1 * 1/2015 Bhasin ................... G06Q 50/01 705/7.29
2015/0089399 A1 * 3/2015 Megill ............... G06Q 30/0203 715/753
2015/0169888 A1 * 6/2015 McClendon .................. 707/785

* cited by examiner

*Primary Examiner* — Thien M Le
*Assistant Examiner* — Claude J Brown
(74) *Attorney, Agent, or Firm* — Erik Huestis; Stephen Kenny; Foley Hoag LLP

(57) ABSTRACT

Embodiments of the present invention relate to dynamic determination of membership duration based on ongoing interactions with online communities. In one embodiment of the present invention, a method of and computer program product for providing temporary membership in online communities are provided. A membership record is created corresponding to a user of an online community. An initial expiration date is assigned to the membership record. At least one activity of the user in the online community is detected. A revised expiration date is assigned to the membership record based on the at least one activity of the user.

18 Claims, 2 Drawing Sheets

TEMPORARY MEMBERSHIP IN ONLINE COMMUNITIES

BACKGROUND

Embodiments of the present invention relate to temporary membership in online communities, and more specifically, to dynamic determination of membership duration based on ongoing interactions with online communities.

BRIEF SUMMARY

According to one embodiment of the present invention, a method of and computer program product for providing temporary membership in online communities are provided. A membership record is created corresponding to a user of an online community. An initial expiration date is assigned to the membership record. At least one activity of the user in the online community is detected. A revised expiration date is assigned to the membership record based on the at least one activity of the user.

DETAILED DESCRIPTION

Figure 1:
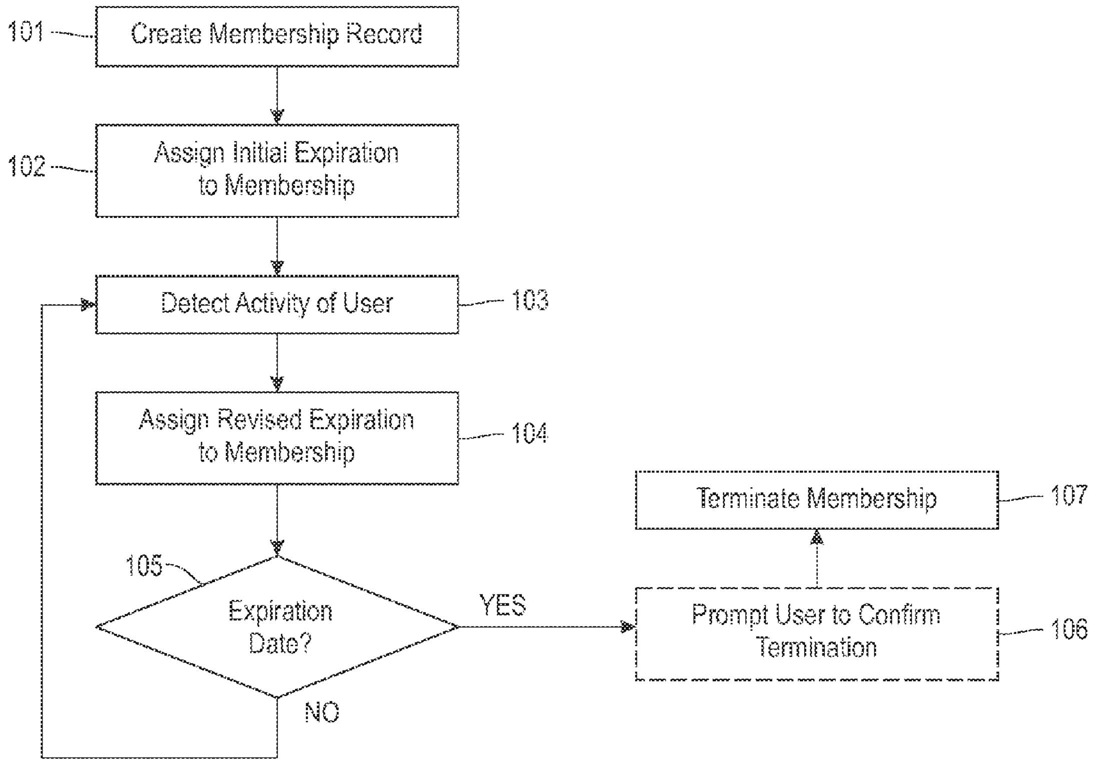
FIG. 1 illustrates a method according to an embodiment of the present disclosure.

There has been an increase in reliance on online communities, social software, e-commerce sites, online collaboration system, and the like in both the workplace and in personal life. A variety of well-known social networking sites, blogging, micro-blogging, and groupware have become an intrinsic part of everyday life. In order to use such online systems, a user must generally become a member, follow a community or person, or subscribe to an activity/artifact, depending on the particular system and its terminology. As used herein, membership refers to any such voluntary interaction with an online system, whether through subscription, following, indication of an interest or the like. As a result of such membership, a user generally receives notifications or updates from these systems. For example, a user may receive notifications of new micro-blogging posts by an author of interest, or may receive notifications from a dating community when a new profile is posted.

Effectively managing membership in online communities and the resulting digital communications (e.g., emails, status updates, push notifications, and advertisements) is a growing challenge for users. A user is frequently a member of many different online communities, resulting in a proliferation of digital communications. The proliferation may be particularly acute for some users in a business setting where employees are asked to join an ever-increasing number of online communities, are added to mailing-lists, team rooms, and online collaborative resources. As a result of the large volume of memberships, a user may frequently receive dozens or hundreds of emails per day, each of which is a notification, update, or alert. Many such notifications are not useful to the user, and are not read. These useless notifications are mixed with important messages, thus concealing them in noise. It is common for a user to take a substantial amount of time on a daily basis handling such unneeded notifications and separating out important messages. This leads to reductions in productivity and sometimes to important messages being overlooked.

Thus, there remains a need for a membership management solution that balances the ability to join online communities without the need to manually track and cancel membership in an online community.

Accordingly, embodiments of the present disclosure provide for temporary membership in online communities. In various embodiments, each member of an online community is provided with an initial expiration date. For example, an expiration date may be one month in certain embodiments. The initial expiration date may be based on a variety of factors in various embodiments. For example, the type of initial interaction with the online community and whether the interaction centers on a particular time-limited event are considered. Subsequent interactions with the community, such as writing or reading posts or uploading documents, extend the expiration date or eliminate it.

Extensions to the expiration date or transition to permanent membership are based on the type and frequency of interaction by the user with the online community. For example, a post to an online community can extend membership by a predetermined amount. Regular posting over a period of time can render membership permanent.

Temporary membership in online communities according to embodiments of the present disclosure is advantageous over conventional permanent membership. The systems and methods of the present disclosure reduce the number of communities that a user is member of by automatically canceling membership if the user ceases to be active in a community without requiring any additional action from the user. Information overload is also reduced. If membership in an online community has been cancelled automatically, the user will not receive any further communication from the online community or its members, thereby avoiding additional emails, alerts, or notifications. This in turn reduces the amount of time required for a user to handle such automatic messages and thereby increases user productivity.

The systems and methods of the present disclosure provide benefits to online community managers as well. The number of inactive community members is reduced, which leads to a reduction in resource requirements. By keeping only active members and permanent members, the quality of the user base is improved. A reduction in user count provides ongoing feedback to a community owner, which allows for timely improvements to the community and its content. By modifying the user base on an ongoing basis, embodiments of the present disclosure enable community owners to better understand the number of active and permanent users in order to allocate or terminate resources as appropriate.

In some embodiments of the present disclosure, membership profiles are stored for each member of an online community. Membership profiles are designated either permanent or temporary. Temporary entries have an associated expiration date. When a temporary profile is created an initial expiration date is determined. The initial expiration date is a predetermined time from profile creation in some embodiments. For example, in some embodiments, the initial expiration date is one month from profile creation. However, alternative embodiments have initial expiration dates of, e.g., one day, one week, on year, or any other suitable period.

Subsequent interactions by a user change the expiration date associated with the membership profile. For example, in a blogging platform, creating a blog post may extend the expiration date by a week. Uploading a file may extend the expiration date by a month. Sharing an existing file may extend the expiration date by three days. Adding a bookmark to an online community may extend the expiration by six months. The expiry period provided are exemplary, and it will be appreciated that different periods are suitable for different online communities and interactions.

In various embodiments, various combinations of interactions are considered. Interactions include, but are not limited to, logins, logouts, posts, reads, click-throughs, forwards, reposts, and replies.

In some embodiments, the extension of the expiration date is determined by the ongoing interaction of a user instead of or in addition to the fixed increases discussed above. In some embodiments, a post rate over time is determined. As long as a certain threshold post rate is maintained, the expiration date is extended on a rolling basis. For example, for every week that a user maintains a one post per day rate, the expiration is extended by an additional week. In another example, once a user maintains a one post per day rate for a month, the membership is made permanent.

In some embodiments, at the time of signup a user is given the opportunity to specify an initial expiration date. This expiration date will then be modified while the system is in use, as described above. The initial expiration date can be specified by the user as a fixed date or as a duration. In some embodiments, the expiration date is tied to an external factor such as a project timeline. For example, the initial expiration date for an online community may be set as the termination date of a project as retrieved from a project management system.

In some embodiments, temporary membership is terminated silently, without notifying the user. In other embodiments, upon expiry, a user is prompted to indicate whether membership should be extended. In such embodiments, the user may be given the option of making their membership permanent, or extending for a user-selectable time period.

With reference now to FIG. 1, a method according to the present disclosure is illustrated. A membership record is created 101. The membership record corresponds to a user of an online community. An initial expiration date is assigned 102 to the membership record. An activity of the user in the online community is detected 103. A revised expiration date is assigned 104 to the membership record. The revised expiration is based on the activity of the user. The current date is checked 105 to determine whether the expiration date has arrived. If it has not, further activities are detected by the user. If it has, then the user is optionally prompted to confirm termination of membership 106. This prompt may be by email, web site, or by other interactive computer program. The user's membership is then terminated 107.

Figure 2:
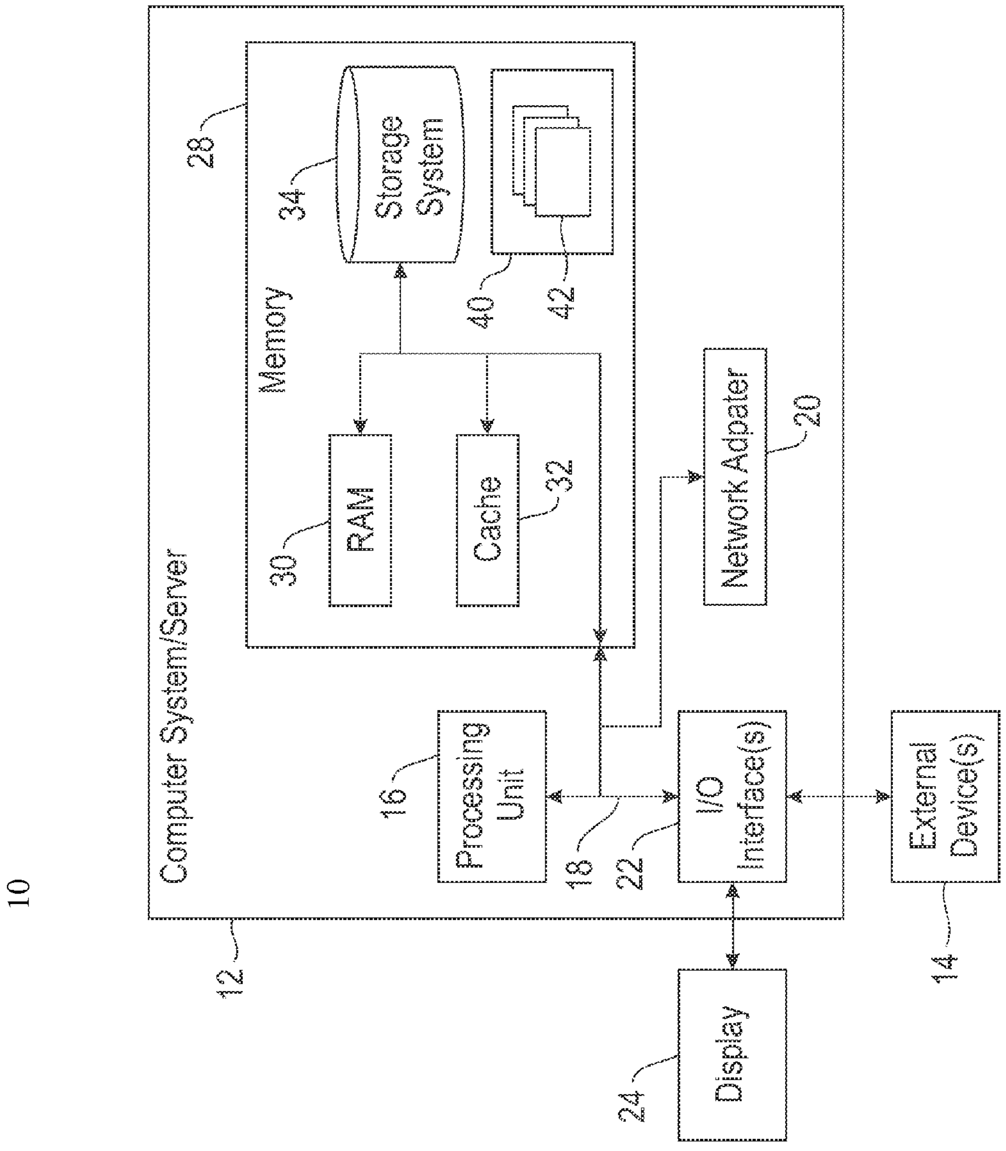
FIG. 2 depicts a computing node according to an embodiment of the present disclosure.

Referring now to FIG. 2, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

creating a membership record corresponding to a user of an online community;

assigning an initial expiration date to the membership record;

detecting the frequency of at least one activity of the user in the online community;

assigning a revised expiration date to the membership record based on the frequency of the at least one activity of the user;

upon the revised expiration date, prompting the user to confirm termination of the membership of the user.

2. The method of claim 1, further comprising:

terminating the membership of the user.

3. The method of claim 1, further comprising:

determining the initial expiration date based on an initial activity of the user in the online community.

4. The method of claim 1, further comprising:

determining the initial expiration date based on a predetermined period.

5. The method of claim 4, wherein the predetermined period is selected from the group consisting of: an hour, a day, a week, a month, and a year.

6. The method of claim 1, further comprising:

determining the initial expiration date by prompting the user.

7. The method of claim 1, wherein the at least one activity of the user is selected from the group consisting of: writing a message; making a post; reading a post; uploading a document; adding a bookmark, forwarding a message; sharing a document; logging in; logging out; clicking; forwarding a message; reposting a message; and replying to a message.

8. The method of claim 1, further comprising:

detecting at least one additional activity of the user in the online community; and rendering the membership of the user permanent.

9. The method of claim 1, further comprising:

rendering the membership of the user permanent upon the frequency exceeding a predetermined value.

10. A computer program product for providing temporary membership in an online community, the computer program product comprising a computer readable storage medium having program instructions embodied therewith, the program instructions executable by a processor to cause the processor to perform a method comprising:

creating a membership record corresponding to a user of an online community;

assigning an initial expiration date to the membership record;

detecting the frequency of at least one activity of the user in the online community;

assigning a revised expiration date to the membership record based on the frequency of the at least one activity of the user;

upon the revised expiration date, prompting the user to confirm termination of the membership of the user.

11. The computer program product of claim 10, the method further comprising:

terminating the membership of the user.

12. The computer program product of claim 10, the method further comprising:

determining the initial expiration date based on an initial activity of the user in the online community.

13. The computer program product of claim 10, the method further comprising:

determining the initial expiration date based on a predetermined period.

14. The computer program product of claim 13, wherein the predetermined period is selected from the group consisting of: an hour, a day, a week, a month, and a year.

15. The computer program product of claim 10, the method further comprising:

determining the initial expiration date by prompting the user.

16. The computer program product of claim 10, wherein the at least one activity of the user is selected from the group consisting of: writing a message; making a post; reading a post; uploading a document; adding a bookmark, forwarding a message; sharing a document; logging in; logging out; clicking; forwarding a message; reposting a message; and replying to a message.

17. The computer program product of claim 10, the method further comprising:

detecting at least one additional activity of the user in the online community; and rendering the membership of the user permanent.

18. The computer program product of claim 10, the method further comprising:

rendering the membership of the user permanent upon the frequency exceeding a predetermined value.

* * * * *